United States Patent [19]
Watanabe et al.

[11] Patent Number: 5,633,104
[45] Date of Patent: May 27, 1997

[54] METHOD FOR MANUFACTURING COLOR FILTER

[75] Inventors: Tsutomu Watanabe, Itami; Jun-ichi Yasukawa, Chigasaki; Toshiaki Ota, Narashino; Nobuhiko Nishihara, Narashino; Tsuyoshi Tokuda, Narashino, all of Japan

[73] Assignee: Shinto Paint Co., Ltd., Hyogo-Ken, Japan

[21] Appl. No.: 570,416

[22] Filed: Dec. 11, 1995

[30] Foreign Application Priority Data

Dec. 26, 1994 [JP] Japan .................................. 6-322897

[51] Int. Cl.$^6$ ..................................................... G02B 5/20
[52] U.S. Cl. ............................... 430/7; 430/321; 205/122
[58] Field of Search ................. 430/7, 321; 205/122, 205/134, 188; 359/68

[56] References Cited

U.S. PATENT DOCUMENTS 4,746,416  5/1988  Jacob .................... 204/297 W
4,890,633  1/1990  Yasui ........................ 134/76

FOREIGN PATENT DOCUMENTS 0444631  9/1991  European Pat. Off. .
61-259434  11/1986  Japan .

OTHER PUBLICATIONS

Abstract of JP 59-090818, "Manufacture of Color filter", Sunao (05/1984).

Primary Examiner—John A. McPherson
Attorney, Agent, or Firm—Watson Cole Stevens Davis, P.L.L.C.

[57] ABSTRACT

A method for manufacturing a color filter which comprises holding an electroconductor and a tetragonal substrate having an electroconductive transparent thin layer on its surface in an electrodeposition bath in such a way that they are spaced apart and in parallel to each other, the substrate being suspended in an inclined state in a manner such that one of the apexes of the tetragonal substrate is located lower than any of its other apexes; carrying out electrodeposition in the electrodeposition bath; and removing the electrodeposited substrate from the electrodeposition bath while maintaining the inclined state; and which permits prompt removal of the bath adhering to the electrodeposited substrate to improve productivity.

10 Claims, 2 Drawing Sheets

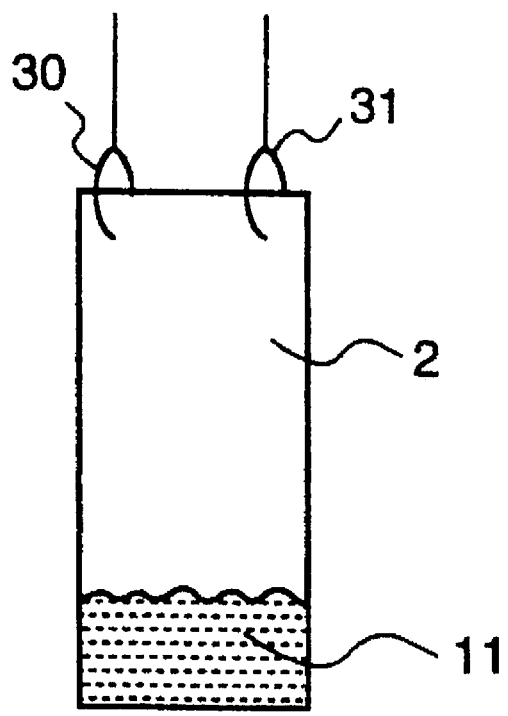

METHOD FOR MANUFACTURING COLOR FILTER

The present invention relates to a method for manufacturing a color filter. More specifically, the invention relates to a method for manufacturing a color filter by electrodeposition.

Color filters suitable for use in the fabrication of color display devices such as color liquid crystal display devices have been manufactured by electrodeposition in a manner such that a transparent substrate having an electroconductive transparent thin layer on its surface as one electrode is put into an electrodeposition bath in such a way that it faces an electroconductor functioning as a counter electrode which is arranged in parallel and at a distance, and an electric current is applied thereto at a voltage to form the desired color layers selectively on the electroconductive layer.

As shown in FIG. 1, in the known electrodeposition, a substrate usually having a tetragonal form, which carries an electroconductive layer on its surface is suspended in an electrodeposition bath vertically to the bath plane by holding at least two positions in the neighborhood of the left and right upper apexes of the substrate with at least two clips or other holding means, one of which also functions as an input terminal.

However, when the color layer-carrying substrate after completion of the electrodeposition is removed from the electrodeposition bath to be subjected to the following steps including washing and heat-treatment of the color layer formed, the bath adhering to the substrate hardly drains away and tends to remain on the lower part of the substrate, as shown in FIG. 3, so that a large amount of the bath is wasted, and moreover much more energy for washing off the bath is needed, resulting in lower productivity.

An object of the present invention is to solve the above problem.

Another object of the present invention is to provide a method for manufacturing a color filter with high productivity.

These and other objects can be accomplished by providing a method for manufacturing a color filter by electrodeposition, which comprises the steps of:

(a) preparing a substrate in a tetragonal form, which carries an electroconductive transparent thin layer on its surface, (b) holding the substrate prepared in step (a) which functions as an electrode and an electroconductor which functions as a counter electrode in an electrodeposition bath in such a way that they are spaced apart and in parallel to each other, the substrate being suspended in an inclined state in a manner such that one of the apexes of the tetragonal substrate is located lower than any of its other apexes by holding an apex opposite to the said lower-located apex with a holding means, so that two sides adjacent to the said lower-located apex are inclined relative to the vertical line, (c) effecting electrodeposition by applying a given voltage to the electrodes which results in an electric current, and (d) removing the substrate obtained in step (c) from the electrodeposition bath, while maintaining the inclined state of step (b).

FIG. 3 shows a state of the color layer-carrying substrate removed from the electrodeposition bath after completion of the electrodeposition according to a known method.

Figure 1:
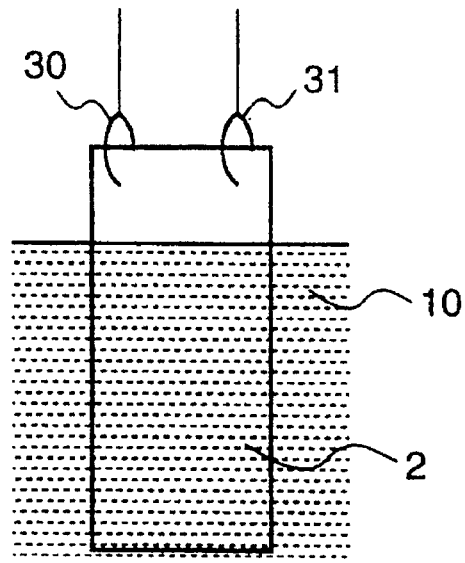
FIG. 1 shows a manner of holding the substrate in a known electrodeposition process.
Figure 2:
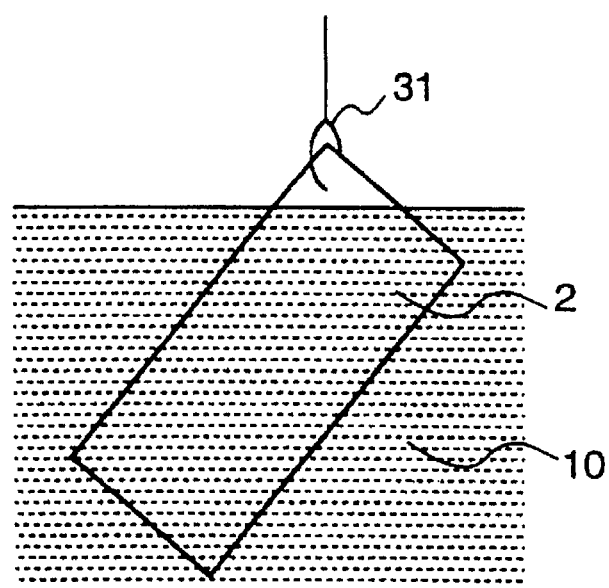
FIG. 2 shows a manner of holding the substrate in accordance with the present invention.

In FIGS. 1, 2 and 3, the numeral 10 is an electrodeposition bath, 11 is the electrodeposition bath remaining on the substrate, 2 is a substrate, 30 is a holding means, and 31 is a holding means also functioning as an input terminal.

The present invention is described in detail below.

In carrying out the method of the present invention, the electrodeposition can be effected in a manner similar to that in a known electrodeposition process, provided that the electroconductive transparent thin layer-carrying substrate used as one electrode is held in the electrodeposition bath in the way mentioned above.

The known electrodeposition includes the anionic and cationic type electrodeposition. In the present invention, because less influence is exerted on the electroconductive layer, the anionic type electrodeposition is preferably carried out.

The electrodeposition bath used for the present invention can be prepared in a conventional manner. For example, colorants of a desired color such as dyes and pigments, electrophoretic resins and if desired, conventional additives are dissolved or dispersed in water or one or more organic mediums and then diluted with water or one or more organic solvents. Examples of the electrophoretic resins are maleinated oil, acryl resins, polyester resins, polybutadiene resins, and polyolefin resins, which may be thermosetting or photocurable resins.

A vessel used for the electrodeposition is not particularly limited as long as its material is insulating and sufficiently resistant to the electrodeposition bath. Examples are rigid plastic vessels such as rigid polyvinyl chloride- and acryl-made vessels.

The substrate used in the present invention is in a tetragonal form, usually in a rectangular parallelogram form, and carries an electroconductive transparent thin layer on its surface. Such substrates can be prepared in a conventional manner. For example, on the one surface of a transparent substrate including a glass substrate and plastic substrate, an electroconductive thin layer such as ITO layer (tin-doped indium oxide layer) or NESA layer (antimony-doped indium oxide layer) is formed in a conventional manner. The layer is, if desired, subjected to etching or the like in order to form more than one electroconductive circuit insulated from each other in a desired pattern such as in stripe form.

The substrate is held in the electrodeposition bath in a manner such that one of the apexes of the tetragonal substrate is located lower than any of its other apexes (said one of the apexes is hereinafter referred to as the lower-located apex) by holding with a holding means an apex opposite to the lower-located apex, so that two sides adjacent to the lower-located apex are inclined relative to the vertical line. The angle of inclination is not particularly limited, and may be one naturally formed by suspending the substrate in the above described manner.

The holding means is not particularly limited as long as it is capable of fixing the substrate in the electrodeposition bath in the above described manner. A commercially available clip can be used. In the method of the present invention, the holding means is used preferably also as an input terminal, and therefore, it is preferred to use an electroconductive holding means.

The substrate and the electroconductor used as a counter electrode are held in an electrodeposition bath in such a way that they are spaced apart and in parallel to each other.

The electroconductor is preferably similar to the substrate in shape and size. More preferably, the size of the electroconductor is somewhat larger than that of the substrate. In carrying out the electrodeposition, the electroconductor is preferably suspended in the same manner as the substrate.

As the electroconductor, a copper- or stainless steel-made electroconductor, which is in a plate form or preferably in a wire-netting form, is preferably used.

As to the location of the substrate, particularly the electroconductive layer, it is natural that the whole electroconductive layer should be below the surface of the electrodeposition bath because the color layers are to be formed on the electroconductive layer provided on the surface of the substrate. If a part of the electroconductive layer is even slightly above the surface of the bath, no color layers are formed thereon and moreover electrolysis of the electroconductive layer may make electrodeposition impossible. On the other hand, when the whole substrate and the holding means are below the surface of the bath, color layers are formed also on the holding means, if it is electroconductive, which may adversely affect the conductivity of the holding means.

Thus, in the present invention, the electrodeposition is preferably carried out while keeping the holding means out of the electrodeposition bath. The holding means may have a tip for nipping the substrate. In such a case, the tip preferably nips the substrate at 0.5 to 1 cm above the electrodeposition bath.

Thus, the triangular area of the substrate above the surface of the bath becomes smaller than the rectangular area of a known electrodeposition process. In other words, the area of the substrate available for carrying the electroconductive layer relative to the surface area of the whole substrate, can be substantially enlarged compared to that available in a known electrodeposition process.

In recent years, the display picture size of the display devices has been rapidly enlarged with a rapid improvement of image quality. In addition, because of the increasingly greater market share of the display devices, the color filter-manufacturing method has been modified to obtain more than one color filter from a sheet of the electroconductive layer-carrying substrate, thereby obtaining high productivity.

The enlargement of the available area of the substrate according to the invention is an effective measure to meet the demands of the said recent trend in this art.

In those cases where the anionic type electrodeposition is carried out, the electroconductive layer formed on the substrate and the electroconductor arranged as a counter electrode are used as anode and cathode, respectively.

The electrodeposition can be carried out by applying a direct current at a voltage ranging from about 10 to 300 V for about 1 second to 3 minutes.

The electrodeposited substrate is removed from the electrodeposition bath while maintaining the aforesaid inclined state after completion of the electrodeposition, whereby the bath adhering to the substrate easily flows to the lower-located apex and drains away promptly, so that the amount of the bath remaining on the substrate is markedly reduced, making washing-off easy and the amount wasted markedly small. Thereafter, the color layer formed can be heat-treated at a temperature of 100° to 280° C. for 10 to 120 minutes in order to enhance the layer strength.

After the formation of the color layers by electrodeposition in accordance with the present invention, followed by after-treatments, black matrices may be formed between the color layers in any known manner. Alternatively, the black matrices may be formed on the transparent substrate before carrying out the electrodeposition in accordance with the present invention.

Further, a display device such as liquid crystal display devices having superior display qualities can be manufactured in a conventional manner by using the color filter thus obtained, for example, by a method comprising placing a pair of base plates at a distance from and in parallel to each other, the one base plate being made by integrally molding the color filter obtained above, to a polarizing plate and a transparent electrode, and the other being made by integrally molding a polarizing plate and a counter electrode, sealing the periphery of the base plates with a sealant, and finally filling the space between the base plates with a liquid crystal.

The present invention is illustrated in more detail with reference to the following Example, which is only illustrative but not limitative.

EXAMPLE

Phthalocyanine Green SAX (manufactured and sold by Sanyo Color Works, in Japan) was dispersed in Esbia ED #3000 Clear* to prepare a green electrodeposition bath.

*Esbia ED #3000 Clear: a paint for electrodeposition manufactured and sold by Shinto Paint Co. in Japan, and composed of 70% by weight of a resin mixture of water-soluble polyester resin and water-soluble melamine resin, and 30% by weight of a solvent mixture of butyl cellosolve, ethyl cellosolve and n-buthanol.

On the other hand, a glass rectangular parallelogram substrate of 1.1 mm in thickness, 300 mm in width and 342 mm in length, having on the major surface tin oxide (ITO) circuits of 15 $\Omega/\square$ in form of a stripes having a width of 70 µm at a distance of 30 µm (100 µm pitch) was prepared as well as a stainless steel-made counter electrode and having the same size as the substrate.

The green electrodeposition bath was put in a vessel. And both the glass substrate and the counter electrode were held in the green electrodeposition bath so that the counter electrode and the major surface of the substrate were spaced apart and in parallel to each other and one of the apexes of the substrate was located lower than any of its other apexes (said one of the apexes is referred to as the lower-located apex), with the substrate suspended in the bath in such a way that two sides adjacent to the lower-located apex of the substrate were inclined relative to the vertical line by holding with an electroconductive clip an apex opposite to the lower-located apex of the substrate.

Using the ITO circuits on the substrate as an anode, a direct current was applied through the clip at 50 V for 10 second at a temperature of 30° C. to complete electrodeposition. Then, green colored layers were formed selectively on the ITO circuits with high precision. When the substrate was removed from the electrodeposition bath while maintaining the aforementioned inclined state, the draining-away of the bath from the substrate was superior and was completed within a few seconds, and almost no bath liquid was found remaining on the substrate.

What is claimed is:

1. A method for manufacturing a color filter, which comprises the steps of:

(a) preparing a substrate in a tetragonal form, which carries an electroconductive transparent thin layer on its surface, (b) holding the substrate prepared in step (a) which functions as an electrode and an electroconductor which functions as a counter electrode in an electrodeposition bath in such a way that they are spaced apart and in parallel to each other, the substrate being suspended in an inclined state in a manner such that one of the apexes of the tetragonal substrate is located lower than any of its other apexes by holding an apex opposite to the said lower-located apex with a holding means, so that two sides adjacent to the said lower-located apex are inclined relative to the vertical line, (c) effecting electrodeposition by applying a given voltage to the electrodes which results in an electric current, and (d) removing the substrate obtained in step (c) from the electrodeposition bath, while maintaining the inclined state of step (b).

2. A method according to claim 1, wherein step (a) includes the step of forming the electroconductive layer into at least two circuits insulated from each other.

3. A method according to claim 1, wherein the electroconductor is similar to the substrate in shape and size.

4. A method according to claim 1, wherein step (b) is carried out while suspending the electroconductor in the electrodeposition bath in a manner such that two sides adjacent to the apex located lower than any of the other apexes of the tetragonal electroconductor are inclined relative to the vertical line by holding with a holding means the apex opposite to the apex located lower than any of the other apexes of the tetragonal electroconductor.

5. A method according to claim 1, wherein step (b) includes the step of holding the substrate prepared in step (a) with an electroconductive holding means.

6. A method according to claim 1, wherein step (c) is carried out while keeping the holding means out of the electrodeposition bath.

7. A method according to claim 1, wherein the holding means has a tip nipping the substrate at 0.5 to 1 cm above the electrodeposition bath.

8. A method according to claim 1, wherein step (c) includes the step of selecting the electroconductive transparent thin layer and the electroconductor as the anode and the cathode, respectively.

9. A method according to claim 1, wherein the electrodeposition in step (c) is carried out by applying a direct current to the electrodes at a voltage ranging from about 10 to 300 V for about 1 second to 3 minutes.

10. A method for fabricating a display device, which comprises placing a pair of base plates apart from and in parallel to each other, the one base plate being made by integrally molding the color filter manufactured by the method of claim 1, to a polarizing plate and a transparent electrode, and the other being made by integrally molding a polarizing plate and a counter electrode, sealing the periphery of the base plates with a sealant, and finally filling the space between the base plates with a liquid crystal.

* * * * *